(12) United States Patent
Fukui et al.

(10) Patent No.: US 9,903,996 B2
(45) Date of Patent: Feb. 27, 2018

(54) LIGHT GUIDE PLATE DISPLAY DEVICE

(71) Applicant: Panasonic Intellectual Property Management Co., Ltd., Osaka (JP)

(72) Inventors: Atsushi Fukui, Osaka (JP); Keizou Matsumura, Osaka (JP); Takayuki Yamaguchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/328,009

(22) PCT Filed: Jun. 2, 2015

(86) PCT No.: PCT/JP2015/002770
§ 371 (c)(1),
(2) Date: Jan. 20, 2017

(87) PCT Pub. No.: WO2016/035228
PCT Pub. Date: Mar. 10, 2016

(65) Prior Publication Data
US 2017/0146721 A1    May 25, 2017

(30) Foreign Application Priority Data
Sep. 3, 2014 (JP) ................. 2014-178613

(51) Int. Cl.
*F21V 7/04* (2006.01)
*F21V 8/00* (2006.01)
*G09F 13/16* (2006.01)

(52) U.S. Cl.
CPC .......... *G02B 6/0036* (2013.01); *G02B 6/003* (2013.01); *G02B 6/006* (2013.01); *G02B 6/0031* (2013.01);
(Continued)

(58) Field of Classification Search
CPC .............................. C07C 67/08; C09D 7/1233
(Continued)

(56) References Cited

U.S. PATENT DOCUMENTS 6,539,656 B2    4/2003  Maas et al.
2001/0049893 A1  12/2001  Maas et al.
(Continued)

FOREIGN PATENT DOCUMENTS

JP    2003-519810    6/2003
JP    2006-075362    3/2006
(Continued)

OTHER PUBLICATIONS

International Search Report of PCT application No. PCT/JP2015/002770 dated Aug. 25, 2015.
(Continued)

*Primary Examiner* — Elmito Breval
*Assistant Examiner* — Glenn Zimmerman
(74) *Attorney, Agent, or Firm* — Panasonic IP Management; Kerry S. Culpepper

(57) ABSTRACT

A light guide plate display device includes a light guide plate, a plurality of light source devices, and a plurality of prisms. The light guide plate includes a display face and a plurality of end faces, and is formed of a light transmitting material. The light source devices are provided along respective end faces of the light guide plate, and radiate light from the end face toward an inside of the light guide plate. The prisms are formed inside the light guide plate. The prisms respectively have a plurality of side faces which face the respective light source devices. The respective side faces are inclined at least in two stages of a transmitting inclined face which transmits light radiated from the light source device, and a reflecting inclined face which reflects the light radiated from the light source device, and outputs the light to the display face, in a thickness direction of the light guide plate.

4 Claims, 15 Drawing Sheets

(52) U.S. Cl.
CPC ......... *G02B 6/0068* (2013.01); *G02B 6/0083* (2013.01); *G02B 6/0088* (2013.01); *G09F 13/16* (2013.01)

(58) Field of Classification Search
USPC ............................ 362/609, 626, 624; 40/546
See application file for complete search history.

(56) References Cited

U.S. PATENT DOCUMENTS

| | | |
|---|---|---|
| 2003/0046842 A1 | 3/2003 | Maas et al. |
| 2005/0036320 A1 | 2/2005 | Park et al. |
| 2007/0127264 A1 | 6/2007 | Sugiura et al. |
| 2010/0014318 A1* | 1/2010 | Chi ..................... G02B 6/0036 362/620 |
| 2013/0278612 A1* | 10/2013 | Holman ............... G02B 6/0031 345/501 |
| 2014/0132887 A1 | 5/2014 | Kurata |
| 2015/0009686 A1* | 1/2015 | Pumyea ................. G02B 6/003 362/341 |

FOREIGN PATENT DOCUMENTS

| | | |
|---|---|---|
| JP | 2007-115439 | 5/2007 |
| JP | 2014-099363 | 5/2014 |

OTHER PUBLICATIONS

The Extended European Search Report dated Aug. 9, 2017 for the related European Patent Application No. 15838705.0.

\* cited by examiner 102,103

102,103

LIGHT GUIDE PLATE DISPLAY DEVICE

CROSS-REFERENCE TO RELATED APPLICATIONS

This application is a U.S. national stage application of the PCT International Application No. PCT/JP2015/002770 filed on Jun. 2, 2015, which claims the benefit of foreign priority of Japanese patent application No. 2014-178613 filed on Sep. 3, 2014, the contents all of which are incorporated herein by reference.

TECHNICAL FIELD

The present invention relates to a light guide plate display device which displays a pattern such as characters or drawing patterns using a light guide plate.

BACKGROUND ART

For example, a light guide plate display device in the related art which is disclosed in PTL 1 includes a light guide plate and a trigonal prismatic prism. Light radiated from an end face to an inside of the light guide plate is output from a display face of the light guide plate in the prism. In this manner, the light guide plate display device displays a pattern. FIGS. 25 and 26 are diagrams which illustrate the light guide plate display device in the related art which is described in PTL 1.

The light guide plate display device described in PTL 1 includes light guide plate 12, four light source device groups 211a to 211d, 212a to 212d, 213a to 213d, and 214a to 214d which radiate light from different directions, respectively, toward end faces of light guide plate 12, and four prism groups 19a, 19b, 19c, and 19d. In FIG. 25, as prism groups 19a, 19b, 19c, and 19d, each one prism is illustrated, respectively; however, in practice, prism groups are formed by being provided with a plurality of prisms in the inside of light guide plate 12.

Prism group 19a is formed in a trigonal prismatic shape with inclined faces which incline to light guide plate 12, respectively, and a perpendicular face which is perpendicular to light guide plate 12, and the inclined face of prism group 19a is provided so as to face a radiation direction of light source devices 211a to 211d. Light input to the inclined face of prism group 19a is reflected in a display direction of light guide plate 12, and is visually recognized by an observer. On the other hand, since light input to the perpendicular face of prism group 19a penetrates the prism, the light is not visually recognized by an observer. Prism group 19a is disposed at an appropriate position in light guide plate 12, and pattern P21 is displayed when light source devices 211a to 211d are turned on.

Inclined faces of prism group 19b are provided so as to face radiation directions of light source devices 212a to 212d, inclined faces of prism group 19c are provided so as to face radiation directions of light source devices 213a to 213d, and inclined faces of prism group 19d are provided so as to face radiation directions of light source devices 214a to 214d. In this manner, the inclined faces of prism group 19b reflect light radiated from light source devices 212a to 212d, and pattern P22 is displayed, the inclined faces of prism group 19c reflect light radiated from light source devices 213a to 213d, and pattern P23 is displayed, and the inclined faces of prism group 19d reflect light radiated from light source devices 214a to 214d, and pattern P24 is displayed. As described above, by performing switching of ON or OFF of light source devices 211a to 211d, 212a to 212d, 213a to 213d, and 214a to 214d, it is possible to display patterns P21 to P24 of four types, and a combination thereof on light guide plate 12.

CITATION LIST

Patent Literature

PTL 1: Japanese Patent Unexamined Publication No. 2006-75362

SUMMARY OF THE INVENTION

The present invention provides a light guide plate display device which can display a plurality of patterns, and improve transparency of a light guide plate.

A light guide plate display device in the present invention includes a light guide plate, a plurality of light source devices, and a plurality of prisms. The light guide plate includes a display face and a plurality of end faces, and is formed of a light transmitting material. The light source devices are provided along respective end faces of the light guide plate, and radiate light from the end face toward an inside of the light guide plate. The prisms are formed inside the light guide plate. The prisms respectively have a plurality of side faces which face the respective light source devices. The side faces are respectively inclined at least in two stages of a transmitting inclined face which transmits light radiated from the light source device, and a reflecting inclined face which reflects the light radiated from the light source device, and outputs the light to the display face in a thickness direction of the light guide plate.

It is possible to display a plurality of patterns in one prism group, using the above described prism. Therefore, it is not necessary to use prism groups of the same number as those of the light source device. In addition, it is possible to set a total area of a region in which prisms are formed with respect to an area of the display face of the light guide plate to be small, and improve transparency of the light guide plate.

DESCRIPTION OF EMBODIMENT

Problems in a light guide plate display device in the related art will be simply described in advance of descriptions of an embodiment of the present invention. In the configuration described in PTL 1, it is possible to display only one pattern with respect to one prism group. Therefore, in order to display patterns of four types, it is necessary to perform disposing, using four prism groups 19a to 19d with different directions of inclined faces, respectively, in light guide plate 12. Therefore, a total area of a region in which prisms are formed becomes large with respect to an area of a display face of light guide plate 12. As a result, transparency of light guide plate 12 deteriorates.

Figure 27:
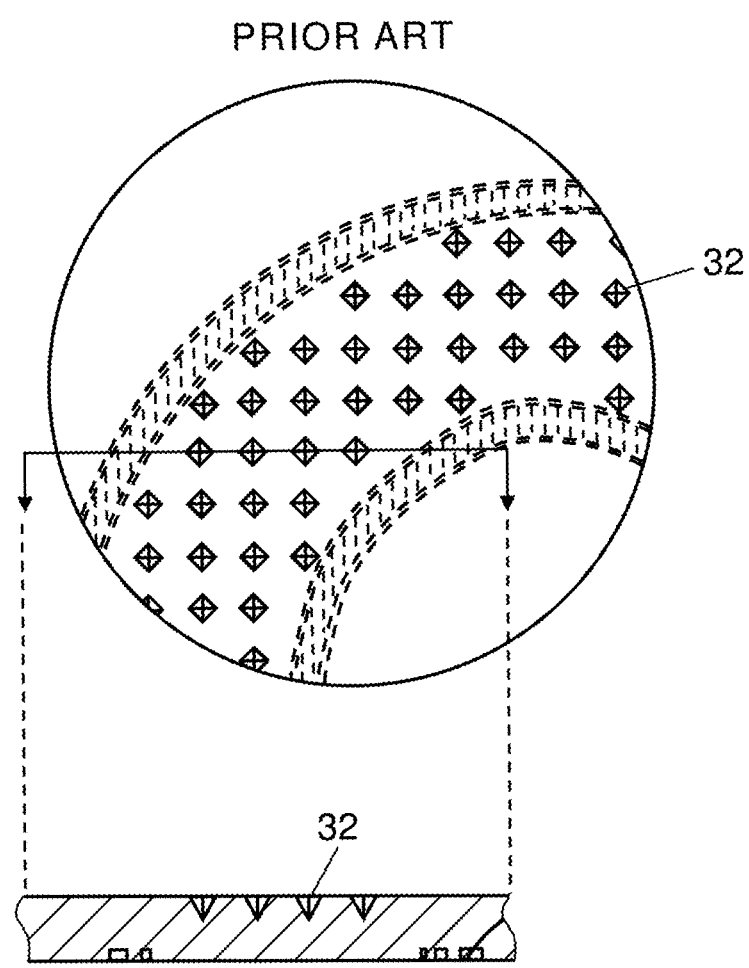
FIG. 27 is a plan view and a sectional view of another light guide plate display device in the related art.

FIG. 27 is a diagram which illustrates a light guide plate display device in another related art in which a quadrangular pyramid-shaped prism is used. Each inclined face of quadrangular pyramid-shaped prism 32 is formed in the same shape, and it is possible to display a single pattern with uniform brightness, using light from any direction. According to the configuration, it is possible to display only one pattern, since quadrangular pyramid-shaped prism 32 with a simple structure is used.

Figure 1:
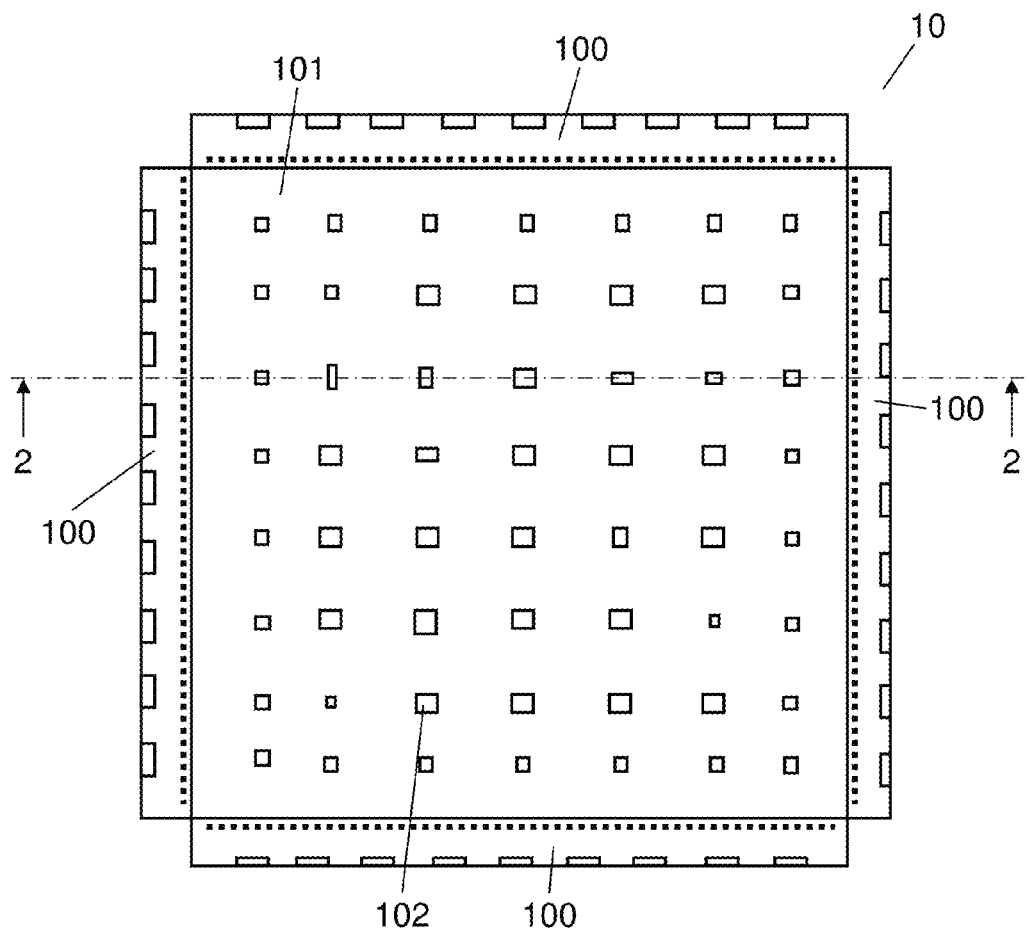
FIG. 1 is a plan view of a light guide plate display device according to an embodiment of the present invention.
Figure 2:
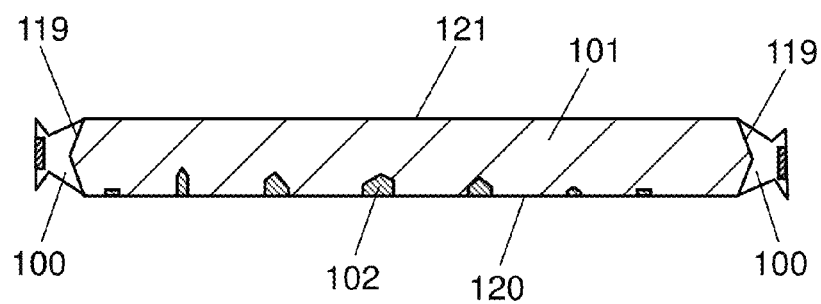
FIG. 2 is a sectional view which is cut in line 2-2 of the light guide plate display device illustrated in FIG. 1.
Figure 3:
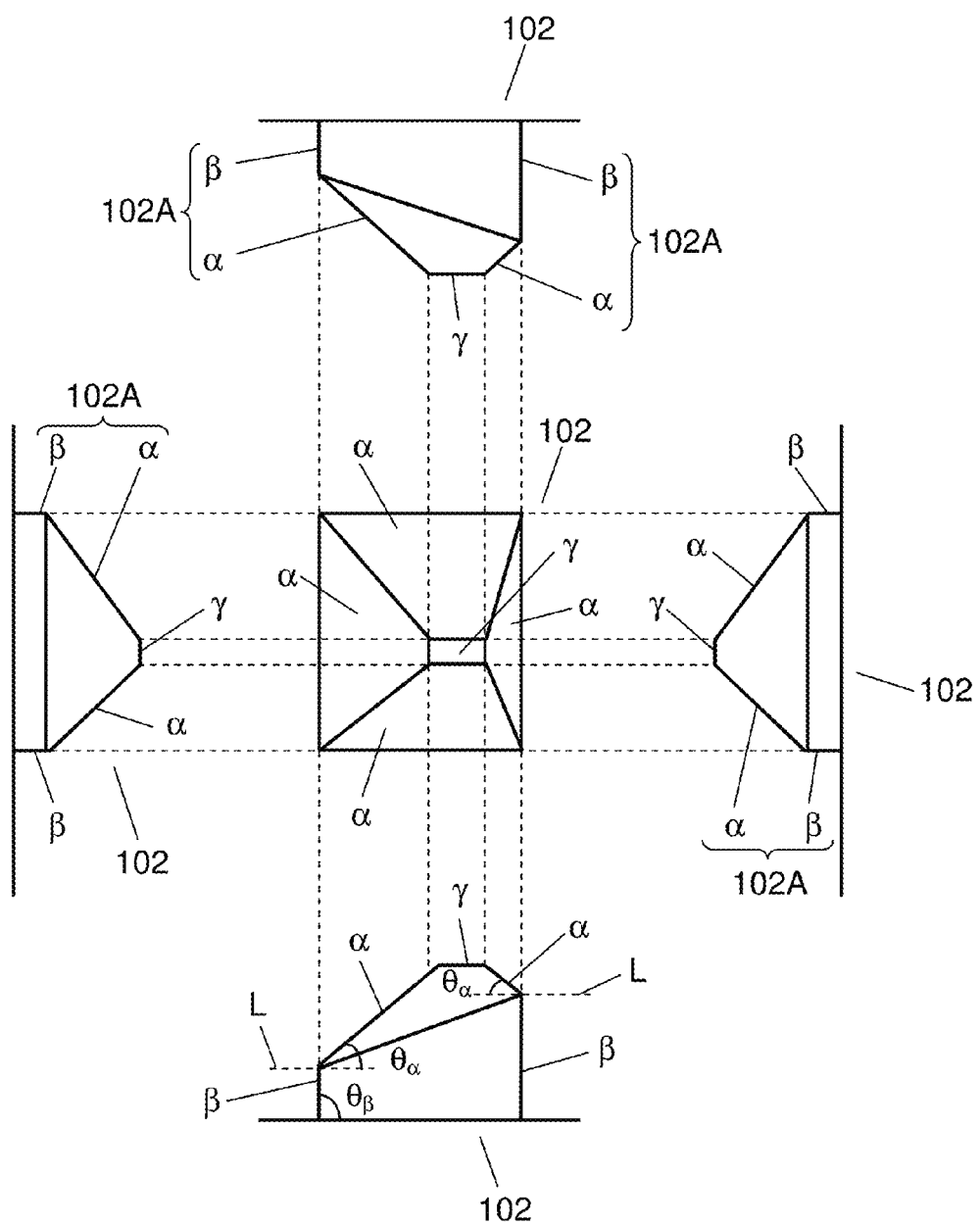
FIG. 3 is a plan view and a side view of a prism according to the embodiment of the present invention.

Hereinafter, light guide plate display device 10 according to an embodiment of the present invention will be described with reference to drawings. FIG. 1 is a plan view of light guide plate display device 10, and FIG. 2 is a sectional view of light guide plate display device 10 which is cut along line 2-2. FIG. 3 is a plan view and a side view of prism 102 of light guide plate display device 10. Light guide plate display device 10 includes light source device 100, light guide plate 101, and plurality of prisms 102.

Light guide plate 101 is a planar plate-shaped material including display face 121, rear face 120, and plurality of end faces 119, and is formed of a material with transparency such as polycarbonate and acryl, for example. For example, specifically, light guide plate 101 is formed in a quadrangular shape when planarly viewed, and includes four end faces 119.

Four light source devices 100 are provided along four end faces 119 of light guide plate 101, and radiate light from end faces 119 of light guide plate 101 toward an inside of light guide plate 101. Prisms 102 are formed inside light guide plate 101. Prisms 102 may be formed of a light transmitting material with a low refractive index compared to a material of light guide plate 101, respectively, and may be intervals provided inside light guide plate 101.

As illustrated in FIG. 3, respective prisms 102 are formed in a rectangular shape when viewed planarly, and include four side faces 102A which face light source device 100, respectively. Side faces 102A are inclined in two stages of reflecting inclined face α and transmitting inclined face β, in a thickness direction of light guide plate 101. An angle formed by transmitting inclined face β and rear face 120, that is, inclination angle $\theta_\beta$ of transmitting inclined face β is approximately 90°. An angle formed by reflecting inclined face α and line L which is parallel to rear face 120, that is, inclination angle $\theta_\alpha$ of reflecting inclined face α is smaller than inclination angle $\theta_\beta$, and for example, 46° to 52°.

That is, light guide plate display device 10 includes light guide plate 101, light source device 100, and plurality of prisms 102. Light guide plate 101 includes display face 121 and plurality of end faces 119, and is formed of a light transmitting material. Plurality of light source devices 100 are provided along plurality of end faces 119 of light guide plate 101, respectively, and are disposed so as to radiate light from respective end faces 119 toward the inside of light guide plate 101. Plurality of prisms 102 are formed inside light guide plate 101. Respective prisms 102 include plurality of side faces 102A which face respective light source devices 100. Respective side faces 102A are inclined in at least two stages of transmitting inclined face β which transmits light which is radiated from light source device 100, and reflecting inclined face α which outputs the light radiated from light source device 100 to display face 121 by reflecting the light, in the thickness direction of light guide plate 101. In this manner, side face 102A includes transmitting inclined face β and reflecting inclined face α with an inclination different from that of transmitting inclined face β, in the thickness direction of light guide plate 101. The thickness direction of light guide plate 101 is a direction perpendicular to display face 121.

Figure 4:
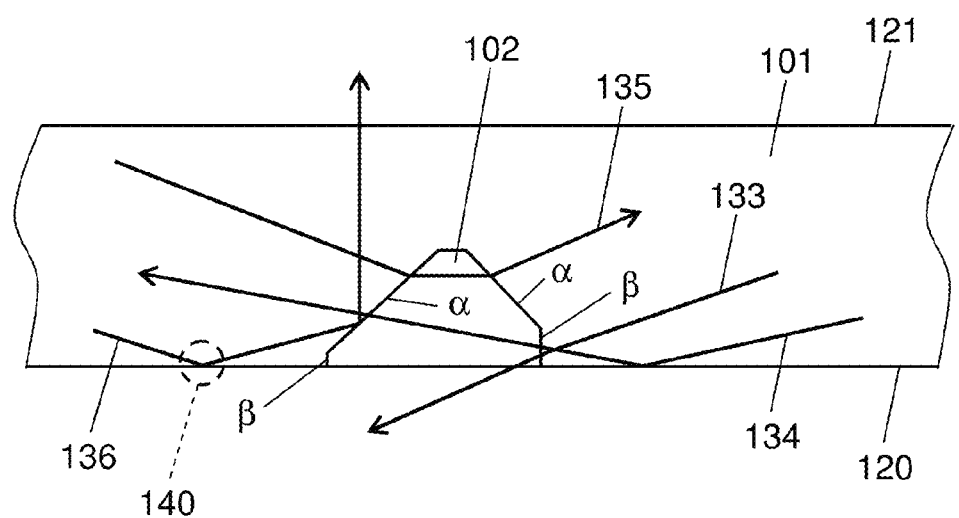
FIG. 4 is a diagram which illustrates an operation of a prism illustrated in FIG. 3.

Subsequently, an operation of light guide plate display device 10 will be described with reference to FIG. 4. Light beams 133 to 136 are radiated from light source device 100 in FIG. 1. Light beam 133 is inclined so as to face rear face 120 of light guide plate 101 in the inside of light guide plate 101, and is input to transmitting inclined face β of prism 102. Since inclination angle $θ_β$ of transmitting inclined face β is approximately 90°, most of light beams 133 transmit transmitting inclined face β of prism 102. Thereafter, light beam 133 is output from rear face 120 of light guide plate 101.

Light beam 134 is inclined so as to face display face 121 of light guide plate 101 in the inside of light guide plate 101, and is input to transmitting inclined face β of prism 102. Thereafter, most of light beams 134 penetrate transmitting inclined face β, penetrate reflecting inclined face α or transmitting inclined face β on a side opposite to prism 102, and return to the inside of light guide plate 101 again.

Light beam 135 is inclined so as to face rear face 120 of light guide plate 101 in the inside of light guide plate 101, and is input to reflecting inclined face α of prism 102. Thereafter, most of light beams 135 penetrate reflecting inclined face α, and return to light guide plate 101 again. Since light beams 133 to 135 are not output from display face 121 of light guide plate 101, the light beams do not contribute to a pattern display.

Light beam 136 is inclined so as to face display face 121 of light guide plate 101 in the inside of light guide plate 101, and is input to reflecting inclined face α of prism 102. Thereafter, most of light beams 136 are totally reflected on reflecting inclined face α, and are output from display face 121 of light guide plate 101. Light output from display face 121 is recognized by an observer. Therefore, light beam 136 contributes to a pattern display of light guide plate display device 10. That is, among light beams 133 to 136, only light beam 136 contributes to a pattern display. In respective prisms 102, when an area of reflecting inclined face α becomes large with respect to an area of transmitting inclined face β, a ratio of light beam 136 contributing to a pattern display increases. Therefore, luminance in a pattern display is proportional to the area of reflecting inclined face α.

In light guide plate display device 10, side face 102A of prism 102 faces light source device 100. Side face 102A can display a plurality of patterns in one prism group by being inclined in two stages of reflecting inclined face α and transmitting inclined face β. Hereinafter, descriptions will be made in detail.

Figure 5:
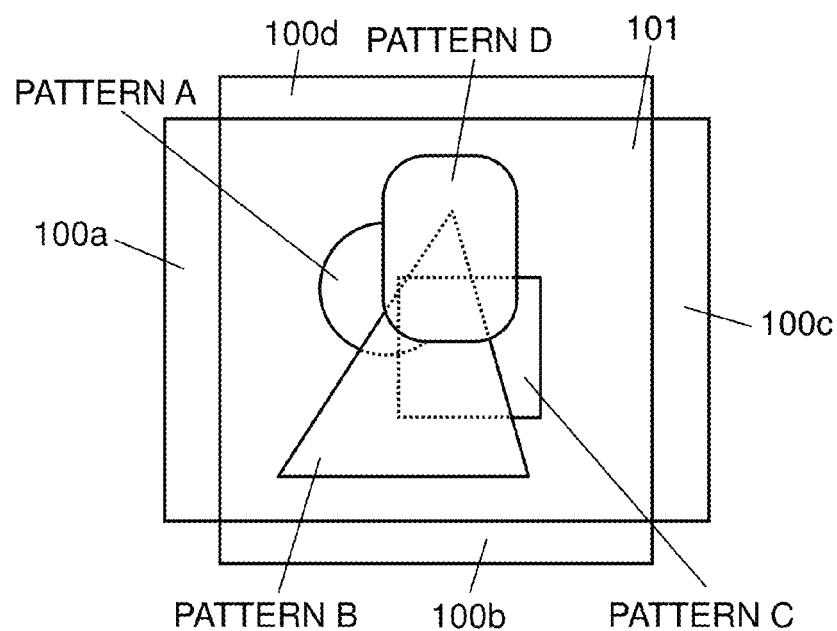
FIG. 5 is a diagram which exemplifies a state in which a pattern is displayed in the light guide plate display device illustrated in FIG. 1.
Figure 6:
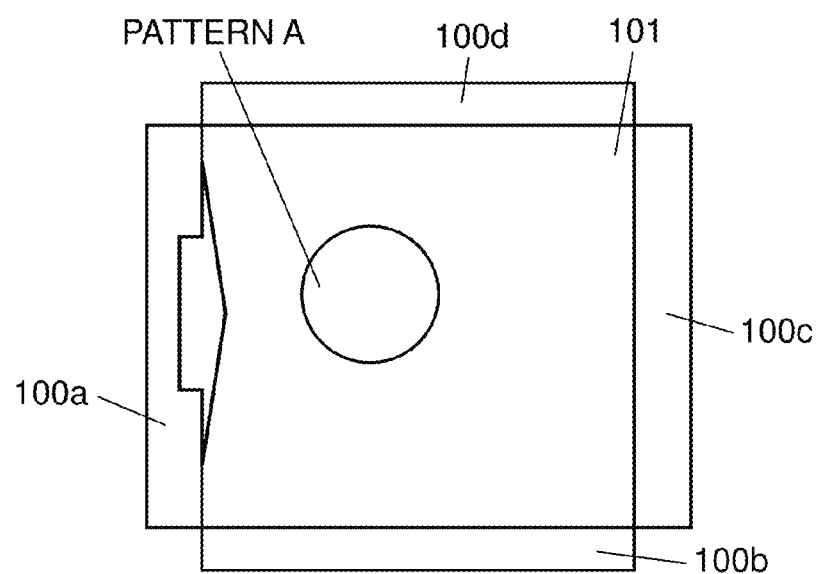
FIG. 6 is a diagram which exemplifies another state in which a pattern is displayed in the light guide plate display device illustrated in FIG. 1.

FIG. 5 illustrates patterns A, B, C, and D which are displayed by light source devices 100a, 100b, 100c, and 100d. FIG. 6 illustrates a state in which only light source device 100a is turned on, and only pattern A is displayed on the display face of light guide plate 101. In prism 102 which is located at a portion of pattern A, an area of reflecting inclined face α on the side face which faces light source device 100a each other is set to be large. Therefore, light radiated from light source device 100a is easily output to the display face by being reflected on reflecting inclined face α of prism 102 which is located at a portion of pattern A. As a result, only luminance of the portion of pattern A is improved. On the other hand, at a portion other than pattern A, the area of reflecting inclined face α on the side face which faces light source device 100a each other is set to be small, in prism 102. Therefore, luminance at the portion other than pattern A decreases. In this manner, it is possible to display pattern A by turning on light source device 100a.

Figure 7:
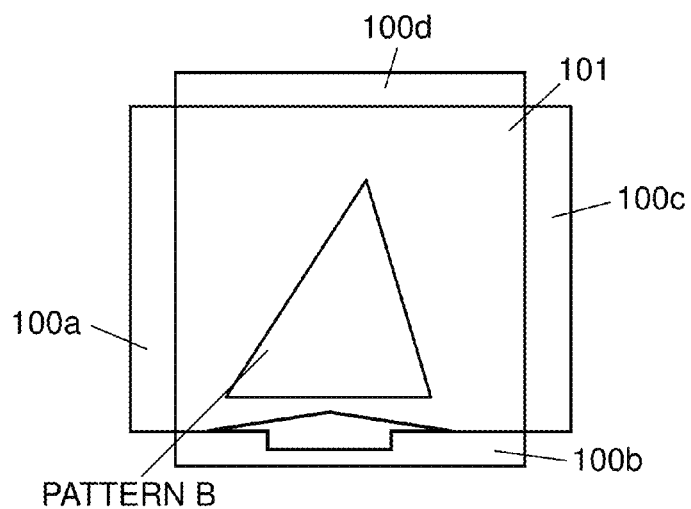
FIG. 7 is a diagram which exemplifies still another state in which a pattern is displayed in the light guide plate display device illustrated in FIG. 1.
Figure 8:
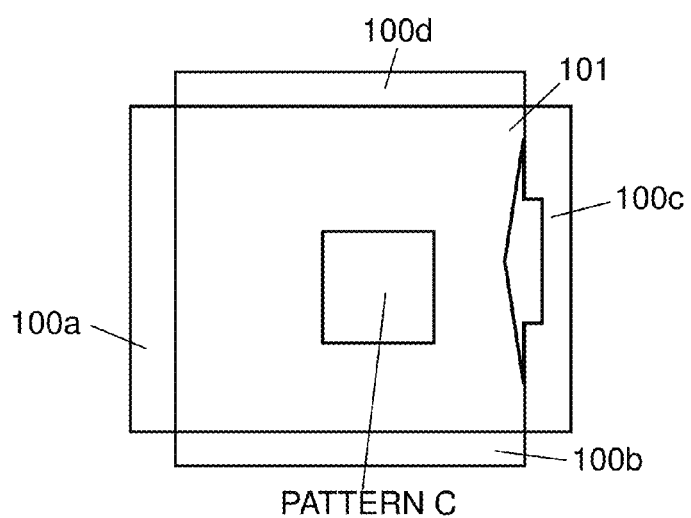
FIG. 8 is a diagram which exemplifies still further another state in which a pattern is displayed in the light guide plate display device illustrated in FIG. 1.
Figure 9:
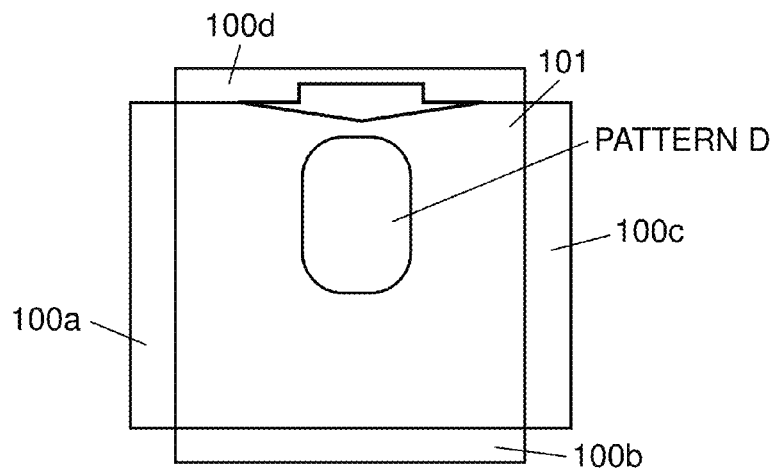
FIG. 9 is a diagram which exemplifies still further another state in which a pattern is displayed in the light guide plate display device illustrated in FIG. 1.

FIG. 7 illustrates a state in which only light source device 100b is turned on, and only pattern B is displayed on the display face of light guide plate 101. FIG. 8 illustrates a state in which only light source device 100c is turned on, and only pattern C is displayed on the display face of light guide plate 101. Similarly, FIG. 9 illustrates a state in which only light source device 100d is turned on, and only pattern D is displayed on the display face of light guide plate 101. A method of displaying patterns B, C, and D is the same as a display method of pattern A. That is, in prism 102 in pattern portions, an area of reflecting inclined face α on a face which faces a corresponding light source device each other among light source devices 100b to 100d is set to be large. Patterns A, B, C, and D can be displayed independently; however, a plurality of patters may be displayed in an overlapping manner. For example, when light source device 100a and light source device 100c are turned on at the same time, pattern A and pattern C are displayed by being overlapped.

As described above, in light guide plate display device 10, it is possible to display a plurality of patterns using one prism group, when the side face which faces the light source device of prism 102 each other is inclined in two stages of reflecting inclined face α and transmitting inclined face β. Therefore, in the light guide plate display device which displays a plurality of patterns, it is not necessary to use the same number of prism groups as that of the light source device. It is possible to make a total area of a region in which prisms are formed small with respect to an area of the display face of the light guide plate, and improve transparency of light guide plate 101.

It is preferable that transmitting inclined face β of prism 102 be connected to rear face 120. For example, a mold for forming prism 102 has a shape in which a shape of prism 102 is remained, and the shape is formed, using a cutting tool for machining a mold. In this case, an inclined face of prism 102 is formed, using a blade edge of the cutting tool. However, it is not easy to obtain a complete angle depending on a blade edge of the cutting tool, and a minute curved face portion occurs at an intersection portion of rear face 120 of light guide plate 101 and inclined face of prism 102.

By causing light in the inside of light guide plate 101 to be totally reflected, and changing an angle thereof, reflecting inclined face α outputs the light to display face 121 side. In this manner, since total reflection of reflecting inclined face α is used, a difference in change in angle of input light remarkably influences on luminance in displaying of patterns. A change in angle of reflected light becomes twice of a change in angle input to an inclined face of prism 102. For example, when a refractive index of light guide plate 101 is 1.59, a change in angle of output light when a light beam is output into the air from light guide plate 101 becomes 2×1.59=3.18 times of a change in angle input to the inclined face of prism 102.

When it is assumed that reflecting inclined face α is in direct contact with rear face 120 of light guide plate 101, a minute curved face occurs at an intersection portion of rear face 120 and reflecting inclined face α. When a light beam is totally reflected at the curved face portion, an orientation of a light beam output from light guide plate 101 to the display face is remarkably changed, and it causes a decrease in display luminance, and stray light. On the other hand, when transmitting inclined face β of prism 102 is connected to rear face 120, even when a minute curved face portion occurs at an intersection portion of rear face 120 and transmitting inclined face β, light is not output from transmitting inclined face β in a direction of display face 121 of light guide plate 101. Therefore, there is no case in which the curved face portion remarkably influences on a pattern display. As described above, when transmitting inclined face β of prism 102 is connected to rear face 120, it is possible to prevent a decrease in display luminance, or stray light when displaying patterns.

Here, it is preferable to set an area of reflecting inclined face α of prism 102 located at a position far from light source device 100 to be larger than an area of reflecting inclined face α of prism 102 located at a position close to light source device 100. Hereinafter, descriptions will be made in detail.

Luminance in a pattern display is not only proportional to an area of reflecting inclined face α, but also proportional to density of light which reaches prism 102. Light with high density in light guide plate 101 reaches prism 102 located at a position close to light source device 100. On the other hand, since light reaches after penetrating many other prisms 102, light with low density in light guide plate 101 is input to prism 102 located at a position far from light source device 100. Therefore, it is possible to make luminance in a pattern display to be balanced, by setting an area of reflecting inclined face α of prism 102 located at a position far from light source device 100 to be larger than an area of reflecting inclined face α of prism 102 located at a position close to light source device 100.

Figure 10:
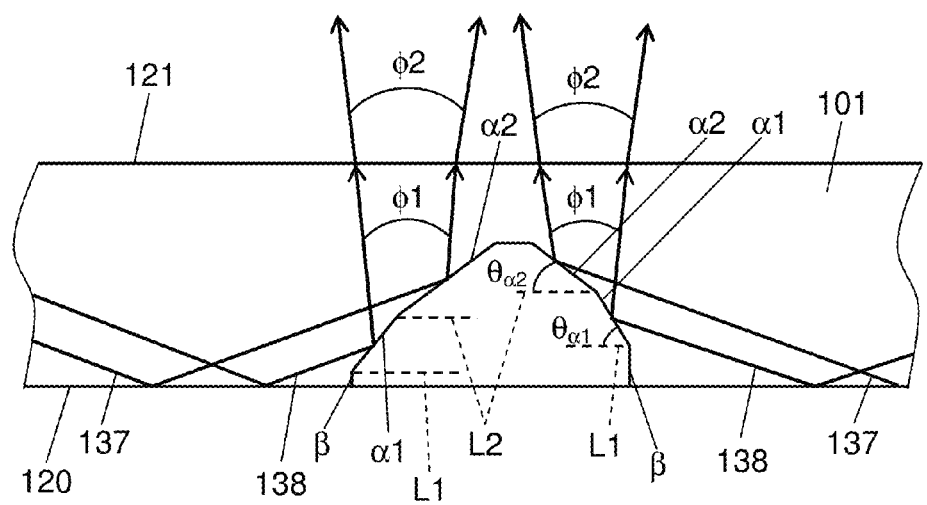
FIG. 10 is a diagram which illustrates an operation of another prism according to the embodiment of the present invention.

As illustrated in FIG. 10, it is preferable that the reflecting inclined face of prism 102 be configured of first reflecting inclined face α1 and second reflecting inclined face α2. FIG. 10 is a diagram which illustrates an operation of another prism 102 according to the embodiment of the present invention. A side face which faces the light source device of prism 102 is inclined in three stages of first reflecting inclined face α1, second reflecting inclined face α2, and transmitting inclined face β in the thickness direction of light guide plate 101. Auxiliary lines L1 and L2 in FIG. 10 are parallel to rear face 120, and an angle formed by auxiliary line L1 and first reflecting inclined face α1, that is, an angle formed by inclination angle $\theta_{\alpha 1}$ of first reflecting inclined face α1, and an angle formed by auxiliary line L2 and second reflecting inclined face α2, that is, inclination angle $\theta_{\alpha 2}$ of second reflecting inclined face α2 are slightly different. For example, $\theta_{\alpha 1}$ is 51°, and $\theta_{\alpha 2}$ is 47°.

In FIG. 10, light beams 137 and 138 are parallel to each other. Light beam 137 is inclined toward display face 121 in the inside of light guide plate 101, and is input to second reflecting inclined face α2 of prism 102. Thereafter, light beam 137 is totally reflected on second reflecting inclined face α2, and is output from display face 121 of light guide plate 101. On the other hand, light beam 138 is input to first reflecting inclined face α1 of prism 102, in a state of being inclined toward display face 121 in the inside of light guide plate 101. Thereafter, light beam 138 is totally reflected on first reflecting inclined face α1, and is output from display face 121.

$\theta_{\alpha 1}$ and $\theta_{\alpha 2}$ are angles which are different from each other. Therefore, light beams 137 and 138 which are parallel to each other before being totally reflected are not parallel after being reflected on second reflecting inclined face α2 and first reflecting inclined face α1, respectively, and are reflected in different directions by $\phi 1 = 2|\theta_{\alpha 1} - \theta_{\alpha 2}|$. When a refractive index of light guide plate 101 is set to n, light beams 137 and 138 which are output from display face 121 of light guide plate 101 are output in different directions by an angle of $\phi 2 = 2n|\theta_{\alpha 1} - \theta_{\alpha 2}|$. That is, when the reflecting inclined face is configured of first reflecting inclined face α1 and second reflecting inclined face α2, it is possible to output light in different directions depending on whether the light is input to first reflecting inclined face α1 or to second reflecting inclined face α2, even when the light is input from the same direction. In this manner, it is possible to expand a viewing angle in a pattern display.

Figure 11:
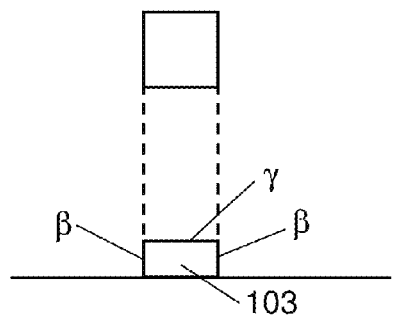
FIG. 11 is a plan view and a side view of a dummy prism according to the embodiment of the present invention.

It is preferable that light guide plate display device 10 include dummy prism 103 which is illustrated in FIG. 11, at a pattern non-display portion of light guide plate 101. FIG. 11 is a plan view and a side view of dummy prism 103.

Figure 12:
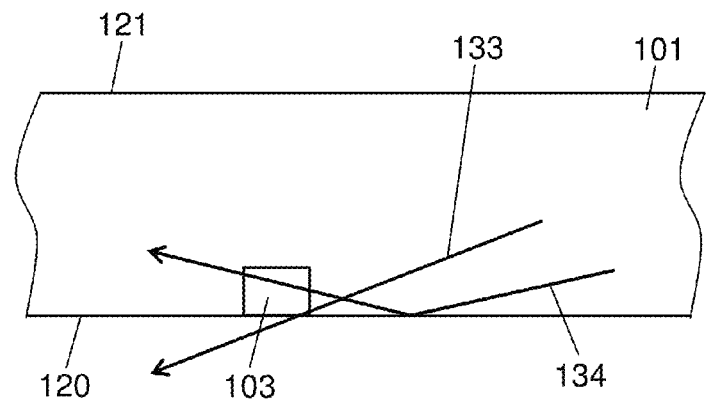
FIG. 12 is a diagram which illustrates an operation of the dummy prism illustrated in FIG. 11.

A side face which faces light source device 100 each other is configured of transmitting inclined face β in dummy prism 103. Therefore, as illustrated in FIG. 12, dummy prism 103 does not output light toward display face 121 even when the light beam is input from any direction. Accordingly, dummy prism 103 does not contribute to a pattern display.

In a case in which dummy prism 103 is not provided at a non-display portion of patterns, prism 102 is provided only at a pattern display portion, and the prism is not provided at the non-display portion of patterns, when light guide plate 101 is observed from display face 121 at a time of turning off light source device 100, a difference occurs in appearance between the pattern display portion and the non-display portion of patterns, though it is slight. Therefore, the pattern display portion is recognized by an observer, and a display quality of patterns deteriorates, even when light source device 100 is turned off.

On the other hand, if dummy prism 103 is provided in the non-display portion of patterns, when light guide plate 101 is observed from display face 121, the light guide plate is crowded with dummy prism 103 and prism 102. Therefore, there is a small difference in appearance between the pattern display portion and the non-display portion of patterns when light source device 100 is turned off. In this manner, it is not easy for an observer to recognize the pattern display portion when light source device 100 is turned off, and it is possible to improve a display quality of patterns, eventually.

In a case in which a total area of a region in which prism 102 is formed is extremely small with respect to an area of display face 121 of light guide plate 101, the difference in appearance between the pattern display portion and the non-display portion of patterns is small. Therefore, dummy prism 103 may not be provided.

It is preferable that planar face γ which connects each side face to each other be provided inside light guide plate 101 in prism 102. In a case in which planar face γ is not provided in prism 102, most of light which penetrates display face 121 from rear face 120 becomes light which passes through a region in which prism 102 is not provided, and light which passes through reflecting inclined face α of prism 102. Since reflecting inclined face α is inclined to light guide plate 101 when an observer sees through light guide plate 101, light passes through the region in which prism 102 is not provided, and light which passes through reflecting inclined face α is remarkably different in appearance. Therefore, a presence of prism 102 becomes conspicuous.

When planar face γ is provided in prism 102, most of light which penetrates display face 121 from rear face 120 becomes light which passes through the region in which prism 102 is not provided, and light which passes through planar face γ. Since there is a small difference in appearance between light which passes through the region in which prism 102 is not provided and the light which passes through planar face γ, it is possible to make the presence of prism 102 inconspicuous. It is possible to make the presence of prism 102 more inconspicuous, by setting an area of planar face γ large with respect to reflecting inclined face α. In a case in which dummy prism 103 is provided, the planar face may be provided also in the dummy prism.

In the inside of light guide plate 101, it is preferable to set an area of the region (forming area) in which prism 102 and dummy prism 103 are provided to be smaller than an area of a region (non-forming region) in which both of prism 102 and dummy prism 103 are not provided. Specifically, it is preferable to set an area of the forming region to be one tenth or less of the area of the non-forming region. In this case, it is not easy for an observer to recognize prism 102 and dummy prism 103, and transparency of light guide plate 101 improves at a time of turning off light source device 100.

When setting a length of one side of the base of prism 102 and dummy prism 103 to q, and an approximate pitch of prism 102 and dummy prism 103 to p, it is preferable to set q<p/sqrt (10). Here, sqrt denotes a square root.

In order to perform a pattern display, it is necessary to cause light in the inside of light guide plate 101 to be totally reflected on reflecting inclined face α of prism 102, and to be output from display face 121 of light guide plate 101. In order to do that, as illustrated in FIG. 4, it is necessary to secure reflecting position 140 at which light beam 136 is reflected on rear face 120 of light guide plate 101 before being input to reflecting inclined face α of prism 102. For example, when prism 102 is densely disposed too much, there is a case in which reflecting position 140 is overlapped with adjacent prism 102. In this case, prisms 102 which are adjacent to each other have an influence on light beam 136, and luminance of output light for a pattern display decreases. Accordingly, it is possible to secure reflecting position 140 when sufficient intervals between prisms 102 can be obtained, and maintain luminance of output light for performing pattern display without being influenced by a light beam each other between prisms 102. In this case, the area of the forming region of the prism and dummy prism 103 becomes one tenth or less of the non-forming region, as described above. Therefore, it is not easy for an observer to recognize prism 102 and dummy prism 103, and transparency of light guide plate 101 improves.

Figure 13:
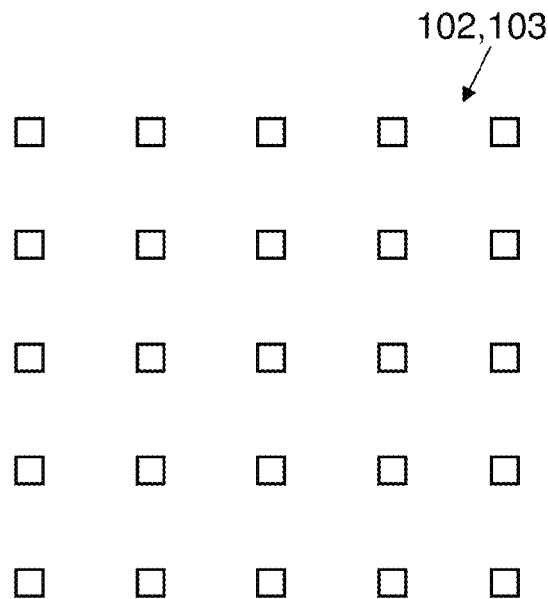
FIG. 13 is a diagram which exemplifies a disposal example of the prism according to the embodiment of the present invention.
Figure 14:
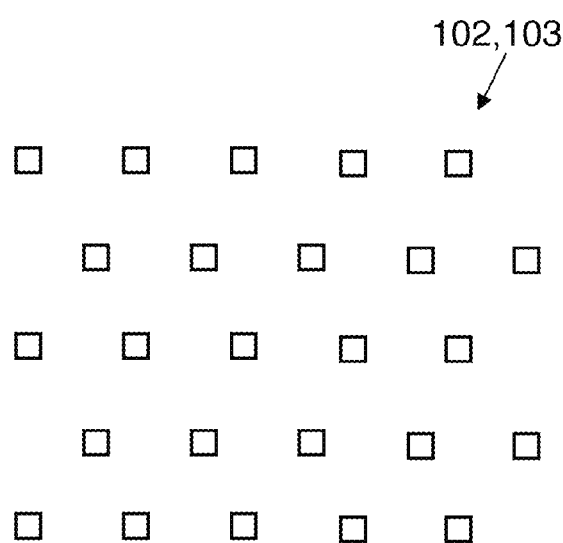
FIG. 14 is a diagram which illustrates another disposal example of the prism according to the embodiment of the present invention.

Disposal examples of prism 102 and dummy prism 103 are illustrated in FIGS. 13 to 16. In FIG. 13, prism 102 and dummy prism 103 are disposed at equal intervals. In FIG. 14, prism 102 and dummy prism 103 are disposed in six directions, and are disposed at equal intervals therebetween.

Figure 15:
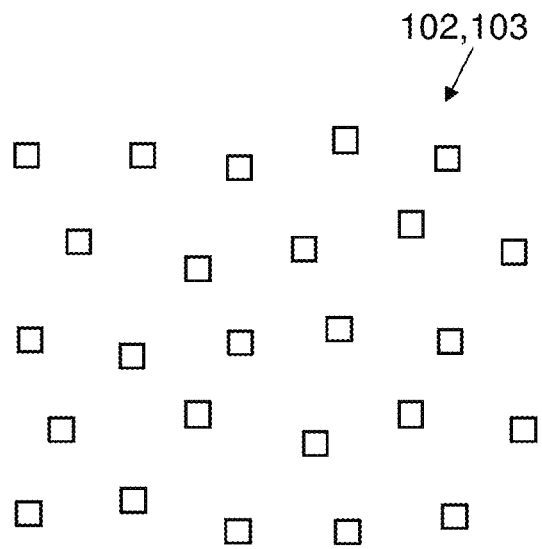
FIG. 15 is a diagram which illustrates still another disposal example of the prism according to the embodiment of the present invention.
Figure 16:
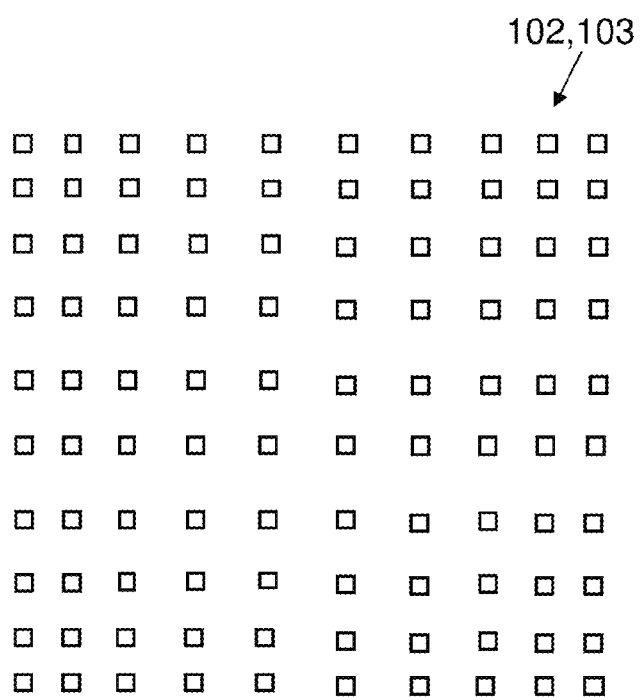
FIG. 16 is a diagram which illustrates still further another disposal example of the prism according to the embodiment of the present invention.

In FIG. 15, prism 102 and dummy prism 103 are disposed at random. Specifically, disposals of prism 102 and dummy prism 103 are set, using a uniform random number in which a predetermined initial value is used. In FIG. 16, prism 102 and dummy prism 103 are disposed at different pitches depending on a location. That is, a pitch in the vicinity of a center of light guide plate 101 is rough, and the pitch becomes fine when getting closer to light source device 100.

In a case in which plurality of light guide plate display devices 10 are used by being overlapped, the number of patterns which can be displayed increases; however, there is a concern that moire may occur between plurality of light guide plate display devices 10. Therefore, it is possible to suppress an occurrence of moire by changing a pitch of prism 102, in each light guide plate display device.

Accordingly, in a case in which prism 102 and dummy prism 103 are randomly disposed as illustrated in FIG. 15, positions of prism 102 and dummy prism 103 are set, using a uniform random number in which a predetermined initial value is used in each of the light guide plates. That is, each of the light guide plates is differently disposed. Alternatively, it may be a configuration in which two-dimensional disposal is performed, using super uniform distribution which is referred to as Halton sequence or Faure sequence, a prism position is set, using a different cardinal number which is different in each light guide plate which is used by being at least overlapped, and different disposal is performed in each light guide plate. As illustrated in FIG. 16, in a case in which prism 102 and dummy prism 103 are disposed at different pitches depending on locations, and two light guide plates are overlapped, disposal is performed so that changing directions of pitches are opposite to each other.

It is preferable to set the disposal pitch of prism 102 and dummy prism 103 to be 0.5 mm or less, for example. For example, a resolution of an observer whose eyesight is 0.5 is two minutes, that is, 0.033°. Accordingly, by setting a disposal pitch to approximately 0.6 mm or less in a distance of 1 m, and a disposal pitch to approximately 0.3 mm or less in a distance of 0.5 m, patterns are discriminated by an observer. Accordingly, it is preferable to set a disposal pitch to 0.5 mm or less, in a case in which an observer views light guide plate display device 10 in a distance of 1 m or more. When a distance between an observer and light guide plate display device 10 is approximately 0.5 m, a disposal pitch may be set to 0.3 mm or less.

Figure 17:
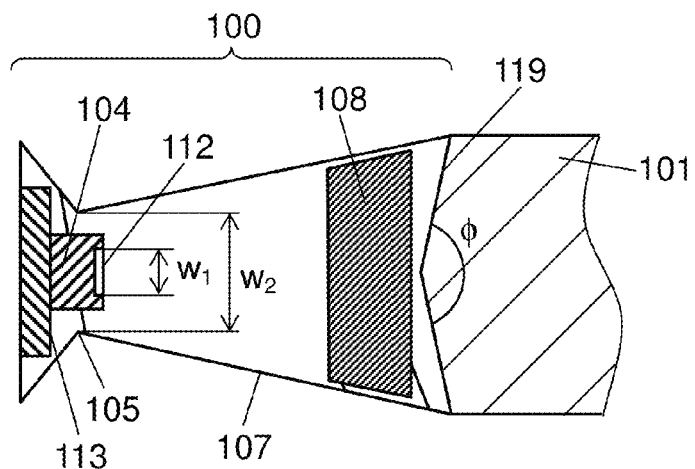
FIG. 17 is a partial sectional view of the light source device and the light guide plate according to the embodiment of the present invention.
Figure 18:
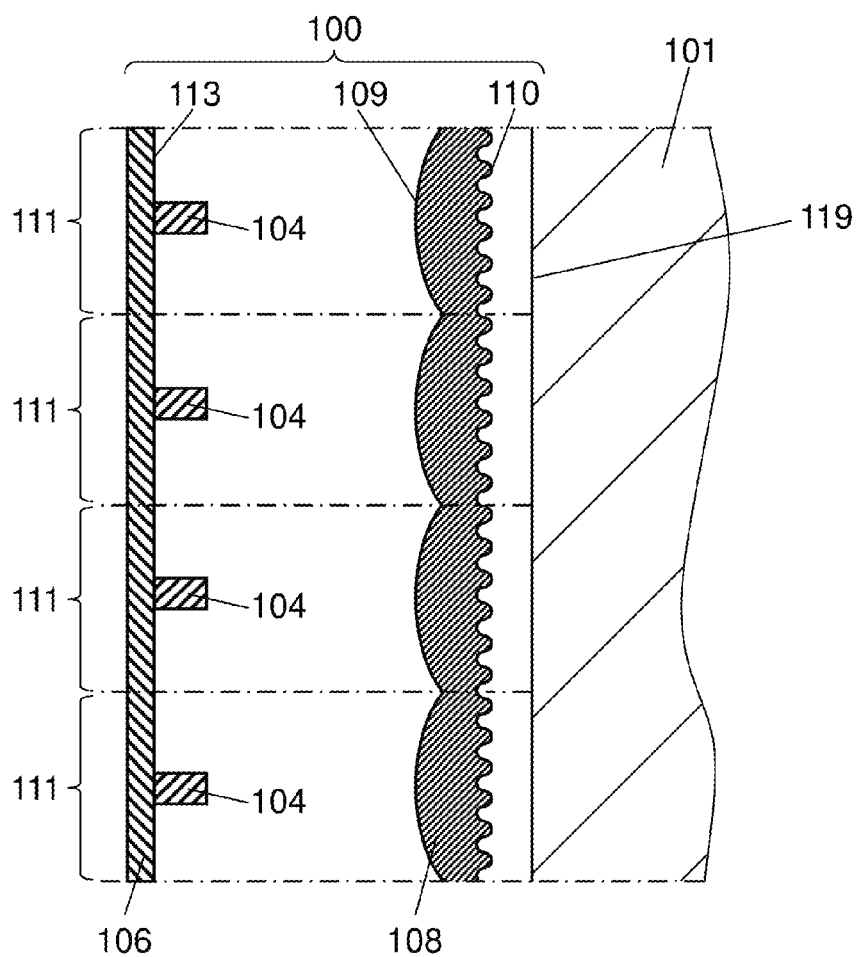
FIG. 18 is a partial sectional view of the light source device and the light guide plate illustrated in FIG. 17.

Subsequently, a preferable configuration of light source device 100 will be described with reference to FIGS. 17 and 18. FIG. 17 is a sectional view which illustrates a part of light source device 100 and light guide plate 101, and FIG. 18 is a partial sectional view of light source device 100 and light guide plate 101, and illustrates a section orthogonal to a thickness direction of light guide plate 101 in FIG. 17. Light source device 100 includes light source 104, light source board 106, reflecting plate 107, and light input lens 108.

Light sources 104 are, for example, light emitting diodes (LED) which are arranged along end face 119 of light guide plate 101, and radiate light of colors of white, or blue, red, and green, or a combination of these colors, conforming with a pattern display. A size of the LED in a radiation face direction is approximately 1 mm or more in general, in a case in which light source 104 is LED, light source 104 is disposed at a disposal pitch of at least 1 mm or more. On the other hand, a disposal pitch of prism 102 and dummy prism 103 is set to approximately 0.5 mm or less, in order to secure transparency of light guide plate 101. Therefore, a disposal pitch of light source 104 is larger than those of prism 102 and dummy prism 103. In FIG. 17, light source 104 includes effective output face 112, and a length of effective output face 112 in a thickness direction of light guide plate 101 is set to w1.

Light source board 106 includes light source mounting face 113, and mounts plurality of light sources 104 on light source mounting face 113, in order to turn on plurality of light sources 104. Light source board 106 is a wiring board such as a glass epoxy board, or a flexible board.

Reflecting plate 107 surrounds light source 104, light source board 106, and light input lens 108 in a state in which a portion between light source board 106 and end face 119 of light guide plate 101 is opened. As a material of reflecting plate 107, for example, there is a material obtained by performing mirror finishing with respect to an aluminum plate, or a material obtained by attaching a sheet deposited using silver or aluminum to a board with high rigidity or a sheet.

Reflecting plate 107 is in close contact with light source board 106, and radiates heat generated from light source 104 to the outside. Reflecting plate 107 includes neck portion 105. Neck portion 105 is located between light source mounting face 113 of light source board 106 and effective output face 112 of light source 104 when viewed planarly. Reflecting plate 107 passes through effective output face 112 of light source 104 from neck portion 105, and is open by being smoothly widened toward end face 119 of light guide plate 101. That is, an interval between reflecting plates 107 of light guide plate 101 in the thickness direction becomes extremely small in neck portion 105. In the thickness direction of light guide plate 101, interval w2 between reflecting plates 107 in neck portion 105 is set to be larger than length w1 of effective output face 112 of light source 104. That is, w1<w2.

Light input lens 108 is formed of a material different from light guide plate 101, and is disposed between light source 104 and end face 119 of light guide plate 101. Light input lens 108 includes first lens face 109 which faces light source 104. First lens face 109 is configured of a plurality of cylindrical lenses, and an axial direction of each cylinder is parallel in the thickness direction of light guide plate 101. The cylindrical lens of first lens face 109 and light source 104 are arranged at the same disposal pitch 111. A focal point position of the cylindrical lens of first lens face 109 is in the vicinity of effective output face 112 of respective light sources 104.

Light input lens 108 includes second lens face 110 which faces end face 119 of light guide plate 101. Second lens face 110 is configured of a plurality of cylindrical micro lens, and an axial direction of each cylinder is parallel in the thickness direction of light guide plate 101. A disposal pitch of a microlens of second lens face 110 is smaller than disposal pitch 111 of first lens face 109. A focal distance of the microlens of second lens face 110 is shorter than the focal distance of the cylindrical lens of first lens face 109. A pitch of the microlens is set to be a non-integral multiple with respect to a disposal pitch of the prism, in order to avoid moire. In FIG. 18, in second lens face 110, a convex-shaped microlens and a concaved microlens are mutually arranged, and are configured as a smooth continuous face; however, it is not limited to this, and second lens face 110 may be configured by repeatedly disposing the convex-shaped microlens or the concave-shaped microlens.

Figure 19:
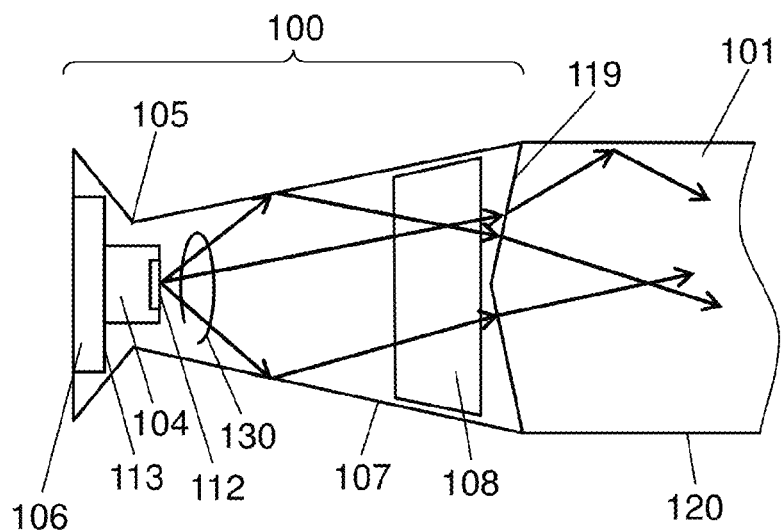
FIG. 19 is a diagram which illustrates an operation of the light source device illustrated in FIG. 17.

Subsequently, an operation of the above described light source device 100 will be described with reference to FIGS. 19 to 21. In FIGS. 19 and 21, light beam 130 is radiated from light source 104. In a section of light guide plate 101 in the thickness direction, as illustrated in FIG. 19, light beam 130 radiated from effective output face 112 of light source 104 passes through light input lens 108 by being directly reflected, or is reflected on reflecting plate 107, and is input to end face 119 of light guide plate 101.

Neck portion 105 of reflecting plate 107 is located between light source mounting face 113 of light source board 106 and effective output face 112 of light source 104 when viewed planarly. Therefore, all of light beams 130 which are radiated from effective output face 112 of light source 104 proceed toward end face 119 of light guide plate 101. Reflecting plate 107 opens toward end face 119 of light guide plate 101 by being smoothly widened. Therefore, when light beam 130 is reflected on reflecting plate 107, light beam 130 gets closer to rear face 120 of light guide plate 101 in parallel. That is, the light beam becomes a slightly parallel light. In this manner, the number of reflecting times of light beam 130 on reflecting plate 107 decreases, and it is possible to suppress useless light absorbing on reflecting plate 107.

It is preferable for end face 119 of light guide plate 101 to be formed in a protruded V shape toward light source 104. By setting end face 119 of light guide plate 101 to the V shape, an input angle of light which passes thorough light guide plate 101 therein toward rear face 120 of light guide plate 101 becomes slightly large. Therefore, it is not easy for the light to leak from rear face 120 of light guide plate 101, and the light is totally reflected on rear face 120 of light guide plate 101. In this manner, the number of times of total reflection of light increases, and the number of times of inputting to prism 102 also increases. As a result, luminance in a pattern display of light guide plate 101 improves.

An angle φ of the V shape of end face 119 of light guide plate 101 may be set to approximately 166°. In a case in which φ is 160° or less, light input from light source device 100 to light guide plate 101 is not totally reflected inside light guide plate 101, and most of components are leaked. When end face 119 of light guide plate 101 is not formed in the V shape, and is set to a protruded curved face toward light source 104, the same effect is obtained.

First lens face 109 and second lens face 110 are cylindrical lenses, and directions of cylindrical axes are parallel to the thickness direction of light guide plate 101. Therefore, in a section of light guide plate 101 in the thickness direction illustrated in FIG. 19, there is no lens operation, and light beam 130 is input to end face 119 of light guide plate 101 by passing thorough light input lens 108.

Figure 20:
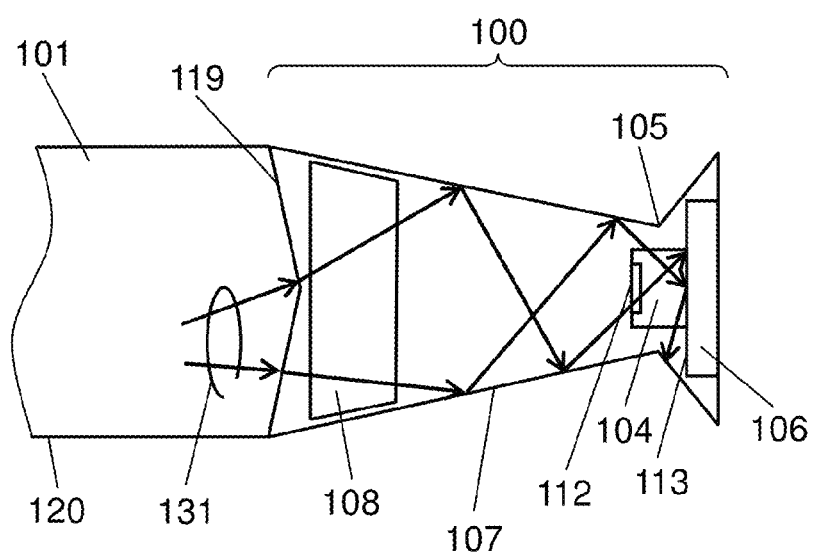
FIG. 20 is a diagram which illustrates another operation of the light source device illustrated in FIG. 17.
Figure 21:
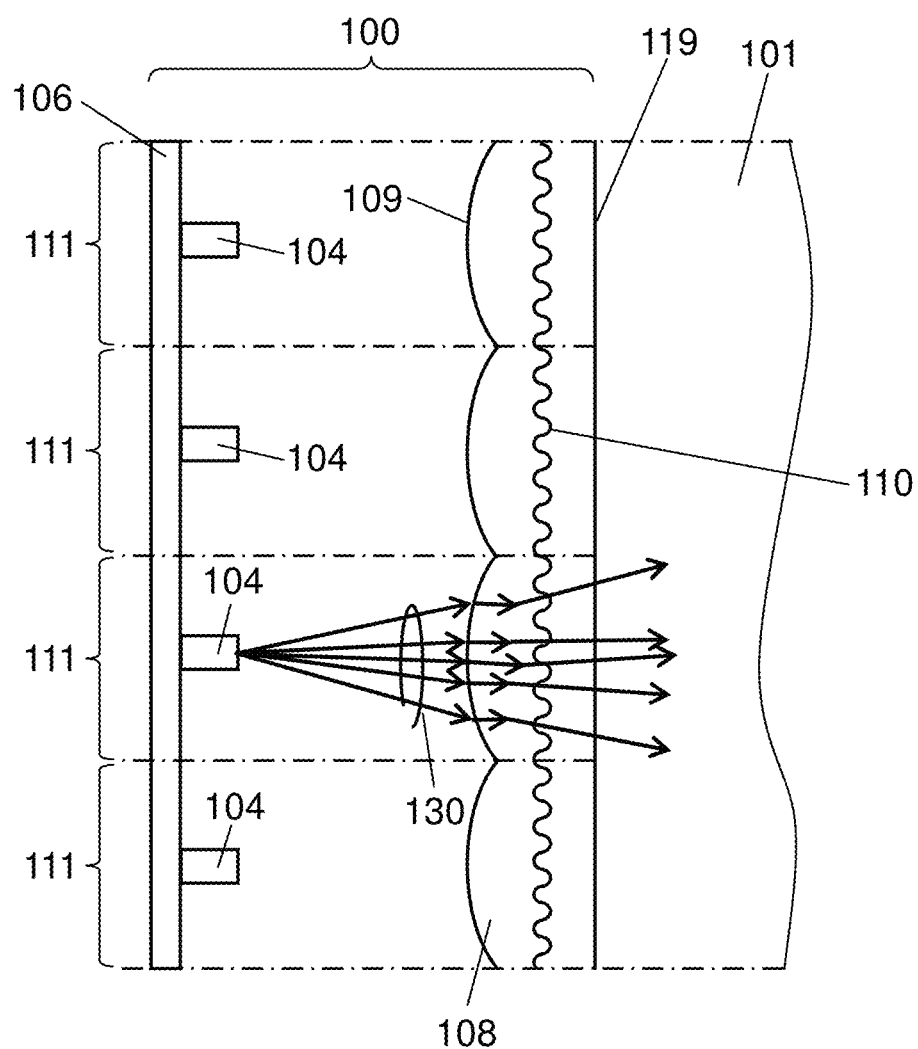
FIG. 21 is a diagram which illustrates an operation of the light source device illustrated in FIG. 18.

Light beam 131 which is input from light source device 100 to end face 119 of light guide plate 101, and is not output from display face 121 of light guide plate 101 due to reflecting inclined face α of prism 102 is input to light source device 100 which the light beam faces, as illustrated in FIG. 20. Light beam 131 passes thorough light input lens 108, and is directly input to light source board 106, or is input to thereto by being reflected on reflecting plate 107.

Reflecting plate 107 includes neck portion 105 at a position close to end face 119 of light guide plate 101, compared to light source mounting face 113 of light source board 106. Therefore, light beam 131 reflected on light source mounting face 113 is reflected in neck portion 105, and is absorbed in light source mounting face 113 by being input again.

Here, it is preferable that reflecting plate 107 be a mirror-finished reflecting plate. In a case of assuming that reflecting plate 107 is a diffuse reflecting plate, a component which returns to the inside of light guide plate 101 by being reflected in a diffusing manner on reflecting plate 107 is generated from light beam 131 which passed through light input lens 108. Due to such a component which returns to the inside of light guide plate 101, there is a concern that an unintended pattern may be displayed on display face 121 of light guide plate 101. On the other hand, in a case in which reflecting plate 107 is the mirror-finished reflecting plate, since light beam 131 is reflected so that an input angle and a reflecting angle become equal, the light beam is absorbed in light source mounting face 113 of light source board 106, finally. Therefore, the component which returns to the inside of light guide plate 101 is not generated, and it is possible to prevent an unintended pattern from being displayed on display face 121 of light guide plate 101.

It is preferable that light source mounting face 113 of light source board 106 be coated with a black color, or the like, so as to increase light absorptivity. That is, it is preferable that light source mounting face 113 of light source board 106 be a black color. In a case in which the light absorptivity of light source mounting face 113 of light source board 106 is low, there is a concern that light beam 131 which reaches light source mounting face 113 of light source board 106 is reflected on light source mounting face 113, passes thorough light input lens 108 again, and returns to the inside of light guide plate 101. By increasing the light absorptivity of light source mounting face 113 of light source board 106, it is possible to suppress returning of light beam 131 to the inside of light guide plate 101 by being reflected on light source mounting face 113.

On the other hand, as illustrated in FIG. 21, light beam 130 which radially expands from effective output face 112 of light source 104 is input to first lens face 109 of light input lens 108, when viewed in the thickness direction of light guide plate 101. First lens face 109 is configured of a cylindrical lens of which an axis is parallel to the thickness direction of light guide plate 101, and a focal position thereof is in the vicinity of effective output face 112 of light source 104. Therefore, light beam 130 becomes a parallel light by passing thorough first lens face 109.

Light beam 130 which is input to first lens face 109 of light input lens 108 is output from second lens face 110. Second lens face 110 is configured of cylindrical microlens of which an axis is parallel to the thickness direction of light guide plate 101. Therefore, light beam 130 which becomes parallel light due to first lens face 109 is diffused by passing thorough second lens face 110. Since a plurality of microlenses on second lens face 110 are provided with respect to one light source 104, light output from light input lens 108 become the number of light sources corresponding to microlenses of second lens face 110, ostensibly. By setting a pitch of the microlenses to be sufficiently narrow, light source device 100 is regarded as a line-shaped light source which is continuous in a direction parallel to end face 119 of light guide plate 101.

When assuming a case in which light input lens 108 is not provided in light source device 100, reflecting inclined face α of prism 102 takes a role of a mirror. Therefore, when an observer views display face 121 of light guide plate 101, effective output face 112 of light source 104 is viewed, and only part of luminance increases or decreases, as a result, a bright line occurs. In contrast to this, by setting light source device 100 to a line-shaped light source, it is possible to input light to end face 119 of light guide plate 101 uniformly, and make luminance be balanced, by remarkably decreasing the bright line.

Figure 22:
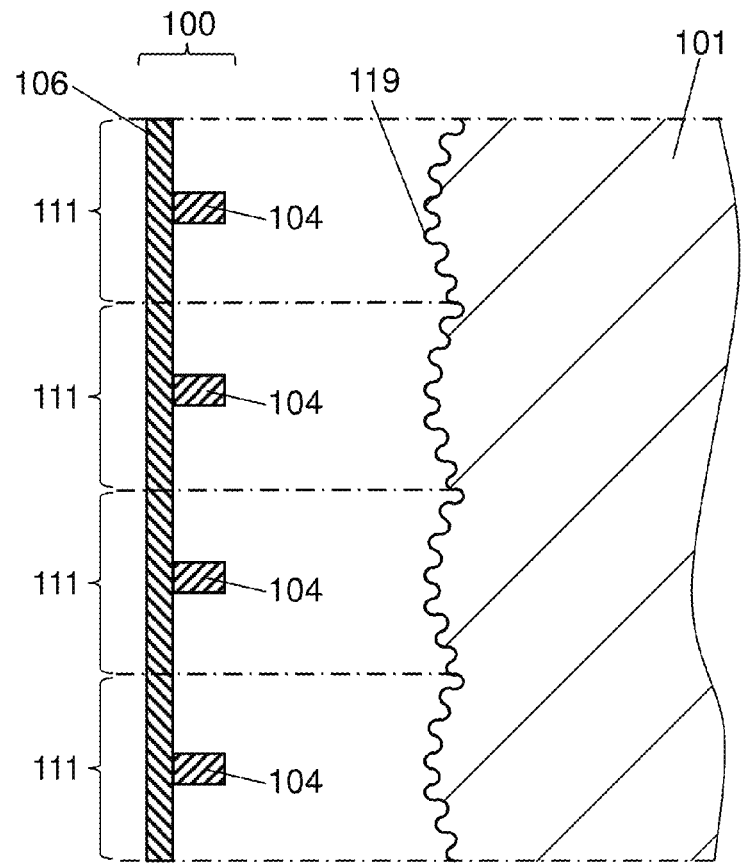
FIG. 22 is a partial sectional view of a light source device and a light guide plate according to another embodiment of the present invention.

As described above, it is preferable that light source device 100 include light input lens 108; however, as illustrated in FIG. 22, it may be a configuration in which light source device 100 does not include light input lens 108, and instead, end face 119 of light guide plate 101 is formed in a shape in which a plurality of cylindrical lenses and a plurality of microlenses are overlapped. In other words, end face 119 of light guide plate 101 is configured of a plurality of microlenses, and the microlens is formed in a cylindrical shape in which an envelope curve of the microlenses is set to a focal point in the vicinity of effective output face 112 of light source 104. Hereinafter, descriptions will be made in detail.

Light input lens 108 takes a role of making output light which radially expands from light source 104 parallel in the cylindrical lens on first lens face 109, and causing the parallelized light to be diffused in the microlens on the second lens face 110. In this manner, output light is refracted on two faces of first lens face 109 and second lens face 110 in total, and it is possible to reduce the bright line from light source 104.

On the other hand, as illustrated in FIG. 22, in a case in which end face 119 of light guide plate 101 is configured, parallelizing and diffusing of output light are performed at the same time, on end face 119 of light guide plate 101, that is, on one face. Therefore, in this case, it is possible to reduce the bright line, compared to a case in which there is no cylindrical lens and microlens. It is possible to obtain a remarkable refraction operation by using many faces due to the refraction operation of light. Therefore, an effect of reducing the bright line decreases in a case of refracting output light on one face, as described above, compared to the case in which output light is refracted on two faces using light input lens 108. However, since light input lens 108 is not used, it is possible to reduce a manufacturing cost by reducing constituent members.

In the above descriptions, as illustrated in FIG. 3, angle $\theta_\beta$ formed by rear face 120 of light guide plate 101 and transmitting inclined face β of prism 102 is set to approximately 90°. However, for example, in order to attach a draft angle when separating light guide plate 101 from a mold at a time of machining light guide plate 101, $\theta_\beta$ is set to be smaller than 90°, and for example, may be set to 70° to 89°. Since a ratio of a light beam which penetrates transmitting inclined face β without being reflected becomes high when $\theta_\beta$ is close to 90°, it is preferable to set $\theta_\beta$ to approximately 90°. When $\theta_\beta$ is smaller than 70°, a ratio of light beam output to display face 121 of light guide plate 101 by being reflected on transmitting inclined face β increases, and there is a concern that an unintended pattern may be displayed.

The case in which LED is adopted as light source 104 is described; however, a line-type light source such as an electroluminescence, a fluorescent tube, or the like, may be used. The case in which light guide plate 101 is a flat-plate shape is described; however, it may be a slightly curved shape.

In FIGS. 5 to 9, patterns A to D are formed in different shapes; however, it is also possible to display a plurality of colors by setting the patterns to the same shape, and colors of light source device 100 to red, blue, and green.

It is also possible to perform highlighting such as a blinking display, and a display using a change in color, or a simple movie display, by changing an output of a plurality of light source devices 100, by causing the output to be changed by being synchronized in time. In the pattern display, an edge of a pattern is emphasized by setting a height of prism 102 at an edge portion of a pattern to be higher than that of prism 102 at a portion other than the edge portion, and it is possible to perform a pattern display which is easy to view.

Figure 23:
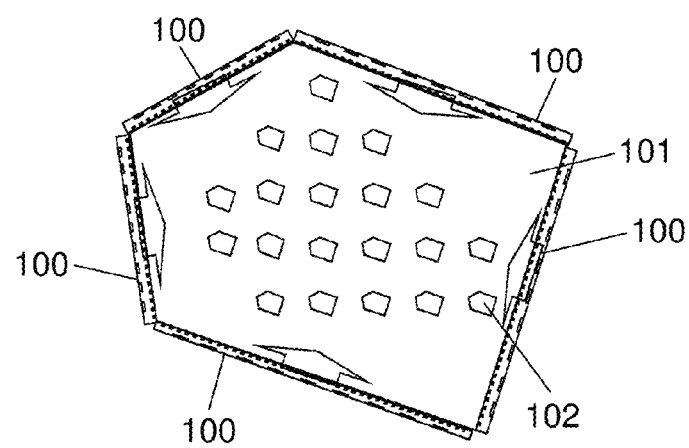
FIG. 23 is a plan view of a light guide plate display device according to still another embodiment of the present invention.

The number of display patterns is not limited to four types. The number of sides of prism 102 and dummy prism 103 is, for example, set to three in a case of a pattern display of three types, set to five, in a case of a pattern display of five types, as illustrated in FIG. 23, and set to m in a case of a pattern display of m types. At this time, side faces of prism 102 have at least inclines of two stages of reflecting inclined face α and transmitting inclined face β, respectively, and it is possible to perform a pattern display of arbitrary types, similarly to the case of a pattern display of four types, by setting an area of reflecting inclined face α.

A shape of light guide plate 101 is not limited to a regular polygon. For example, as illustrated in FIG. 23, the light guide plate is a scalene shape, light source device 100 is disposed in each side, and a shape of prism 102 and dummy prism 103 may be set according to the shape of light guide plate 101.

Figure 24:
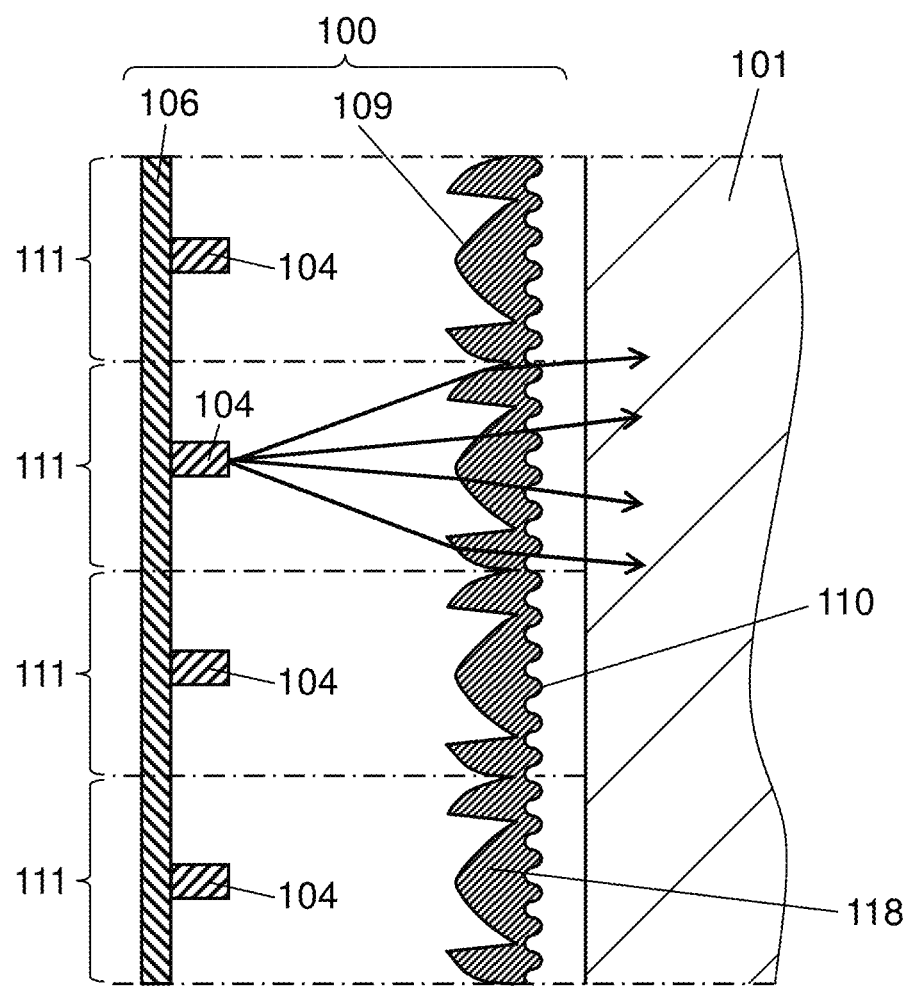
FIG. 24 is a partial sectional view of a light source device and a light guide plate according to still further another embodiment of the present invention.
Figure 25:
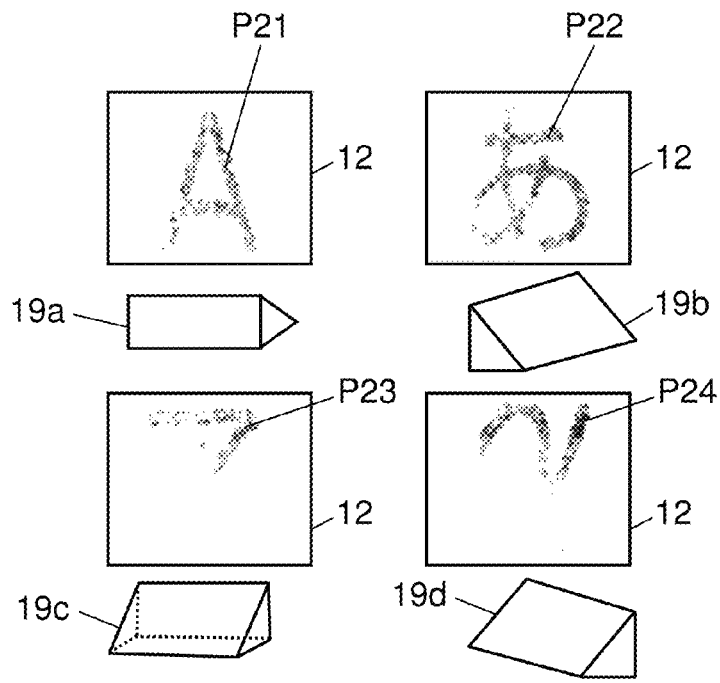
FIG. 25 is a diagram which illustrates a display pattern and a prism of a light guide plate display device in the related art.
Figure 26:
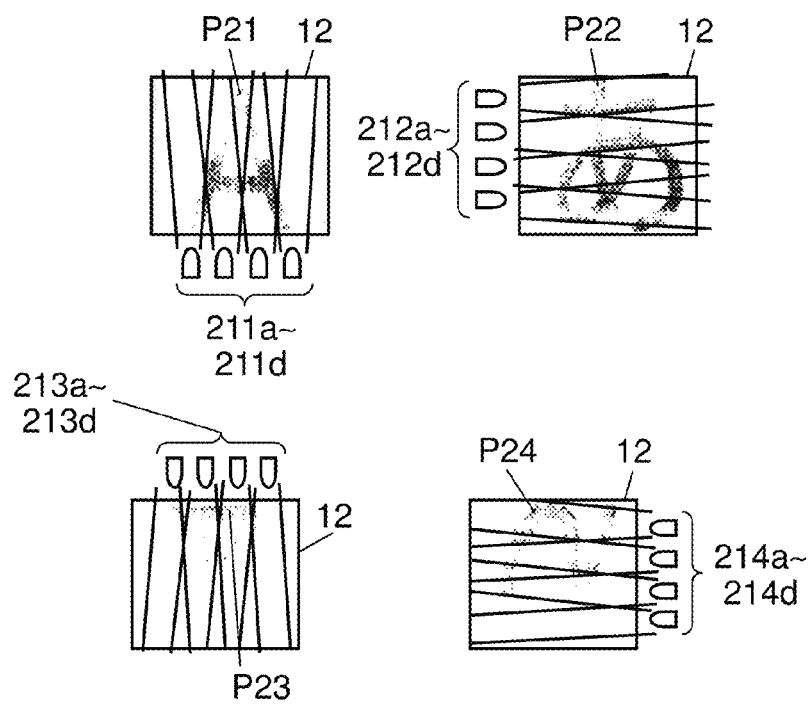
FIG. 26 is a diagram which illustrates a display pattern and a light source device of the light guide plate display device illustrated in FIG. 25.

As illustrated in FIG. 24, light input lens 118 in which a total reflection face is provided on first lens face 109 may be used, instead of light input lens 108. By providing the total reflection face on first lens face 109, it is possible to make light radiated from light source 104 be parallel, by capturing much more light on first lens face 109, and luminance of pattern display improves. It may be a configuration in which both of light input lens 108 and light input lens 118 are not used, and end face 119 of light guide plate 101 is formed in a shape in which a cylindrical lens in which a total reflection face is provided and a microlens are overlapped with each other.

Light source device 100 is set to a line shape by combining light source 104 such as LED and light input lens 108; however, it may be set to a line shape using a light guiding rod system. In this case, light of light source 104 is input from an end face of the light guiding rod, the light is extracted from the light guiding rod using a prism formed on a side face of the rod, and light in a uniform line shape is obtained.

The number of side faces of prism 102 and dummy prism 103 is set to the same number as that of light source device 100; however, the number of side faces of the prism may be set to be larger than that of light source device 100. In this case, a side face which does not face light source device 100 is configured, using only transmitting inclined face β for non-display. For example, a case in which a display pattern which is displayed by using three light source devices 100, and a display pattern which is displayed by using four light source devices 100 are disposed on one light guide plate 101 will be assumed. In this case, prism 102 with three side faces, and prism 102 with four side faces may be respectively disposed. However, when such prisms 102 of two types are mixed, mold machining is apt to be complicated. Therefore, in a pattern displayed by using three light source devices 100, one inclined face of a prism with four side faces is set to transmitting inclined face β for non-display, by setting the number of side faces of the prism to be larger than the number of light source devices 100. By doing so, it is possible to perform a unification of a prism with four side faces, and machining of a mold becomes easy.

Light may not necessarily be radiated from all of light source devices 100 to prism 102 and dummy prism 103. That is, a shape of light guide plate 101 and light source device 100 may be disposed so that the number of light source devices 100 which is radiated to a region is changed in each of the regions of light guide plate 101. Prism 102 of which the number of side faces is changed in each region may be disposed.

INDUSTRIAL APPLICABILITY

The light guide plate display device in the present invention has high transparency, and can display a plurality of patterns. Therefore, the display device can be used in amusements, an accessory light for illumination, or the like.

100, 100a, 100b, 100c, 100d light source device
101 light guide plate
102 prism
102A side face
103 dummy prism
104 light source
105 neck portion
106 light source board
107 reflecting plate
108, 118 light input lens
109 first lens face
110 second lens face
111 disposal pitch
112 effective output face
113 light source mounting face
119 end face
120 rear face
121 display face
130, 131, 133, 134, 135, 136, 137, 138 light beam
140 reflecting position
α reflecting inclined face
β transmitting inclined face
γ planar face

The invention claimed is:
1. A light guide plate display device comprising:
a light guide plate which includes a display face and a plurality of end faces, and is formed of a light transmitting material;
a plurality of light source devices which are provided along the plurality of end faces of the light guide plate, respectively, and radiate light from the respective plurality of end faces of the light guide plate toward an inside of the light guide plate; and
a plurality of prisms which are formed inside the light guide plate,
wherein the respective plurality of prisms have a plurality of side faces which face the respective plurality of light source devices,
wherein the respective plurality of side faces are inclined in at least two stages of a transmitting inclined face which transmits light radiated from the respective plurality of light source devices, and a reflecting inclined face which reflects the light radiated from the respective plurality of light source devices, and outputs the light to the display face, in a thickness direction which is perpendicular to the display face of the light guide plate,
wherein the plurality of light source devices respectively include
a plurality of light sources which are arranged along one of the plurality of end faces of the light guide plate, and include an effective output face which faces the one of the plurality of end faces of the light guide plate,
a light source board which includes a light source mounting face on which the plurality of light sources are mounted,
a light input lens which is disposed between the plurality of light sources and the one of the plurality of end faces of the light guide plate, and
a reflecting plate which surrounds the plurality of light sources, the light source board, and the light input lens except for a portion between the light source board and the one of the plurality of end faces of the light guide plate,
wherein the light input lens includes a first lens face which faces the plurality of light sources, and makes light radiated from the respective plurality of light sources parallel, and a second lens face which faces the one of the plurality of end faces of the light guide plate, and diffuses the light which is paralleled on the first lens face,
wherein the reflecting plate includes a neck portion in which an interval of the light guide plate in the thickness direction becomes extremely small, between the effective output face and the light source mounting face, and the reflecting plate is open so as to expand from the neck portion toward the one of the plurality of end faces of the light guide plate, and
wherein an interval of the reflecting plate in the neck portion is larger than a width of the effective output face, in the thickness direction of the light guide plate.
2. The light guide plate display device of claim 1, wherein the reflecting plate is a mirror-finished reflecting plate.

3. The light guide plate display device of claim 1, wherein the light source mounting face of the light source board is a black color.

4. The light guide plate display device of claim 1, wherein the respective plurality of end faces of the light guide plate are formed in a protruded V shape toward the respective plurality of light source devices.

* * * * *